United States Patent [19]

Takayama et al.

[11] Patent Number: 5,313,340
[45] Date of Patent: May 17, 1994

[54] READ/WRITE CONTROLLING APPARATUS FOR ADJUSTING THE DATA LENGTH OF A MAGNETIC DISK

[75] Inventors: Norikazu Takayama; Tsuneo Hirose; Akira Kojima, all of Odawara, Japan

[73] Assignee: Hitachi, Ltd., Tokyo, Japan

[21] Appl. No.: 823,299

[22] Filed: Jan. 21, 1992

[30] Foreign Application Priority Data

Jan. 23, 1991 [JP] Japan .................................. 3-006073

[51] Int. Cl.$^5$ ................................................ G11B 5/09
[52] U.S. Cl. ............................................ 360/48; 360/51
[58] Field of Search ................ 360/46, 48, 49, 50, 360/62, 51; 369/47, 48

[56] References Cited

U.S. PATENT DOCUMENTS

| | | | |
|---|---|---|---|
| 4,366,512 | 12/1982 | Janak et al. | 360/50 |
| 4,674,071 | 6/1987 | Okumura et al. | 360/48 |
| 4,916,557 | 4/1990 | Okamura | 360/48 |

Primary Examiner—Donald Hajec
Assistant Examiner—T. N. Forbus, Jr.
Attorney, Agent, or Firm—Kenyon & Kenyon

[57] ABSTRACT

The present invention relates to a magnetic disk control apparatus capable of utilizing a data region of a track. The data read/write controlling apparatus according to the present invention comprises a unit for serially reading a signal series constructed of a servo signal and data which has been recorded on a recording track; a unit for generating a first read/write control signal in response to the servo signal of the read signal series; a unit for generating a second read/write control signal between the generation of the servo signal and a generation of a servo signal subsequent to the first-mentioned signal; a unit for writing given data into the data region of the recording track in response to the generation of the read/write control signal; and a unit for externally outputting data read out just after the read/write control signal is generated.

20 Claims, 5 Drawing Sheets

READ/WRITE CONTROLLING APPARATUS FOR ADJUSTING THE DATA LENGTH OF A MAGNETIC DISK

BACKGROUND OF THE INVENTION

The present invention relates to a control for reading data recorded on a magnetic disk and for writing data on the magnetic disk in a magnetic disk apparatus. More specifically, the present invention is directed to a magnetic disk control apparatus for reading and writing data in response to a read/write control signal of data.

There is a magnetic disk (simply referred to as a "disk") known as "embedded servo", wherein control signal regions in which servo information to designate which head of is outputting actual data has been recorded, and data regions in which the read data are recorded are alternately connected with each other to constitute a recording track. Such an embedded servo type disk has a merit with respect to data recording density, as compared with the conventional magnetic disk apparatus in which the tracks on which the real data are recorded and the tracks on which the servo signals for controlling the position of the magnetic head are recorded are formed separately on the magnetic disk.

In the conventional embedded servo type magnetic disk apparatus, the read/write control signal, namely the index sector pulse (ISP) signal is produced in response to the servo information from the control signal of the track, and the read data are transferred to an external unit, for instance, a host computer in response to the generation of the ISP signal (concerning the "data transfer" operation).

Figure 1:
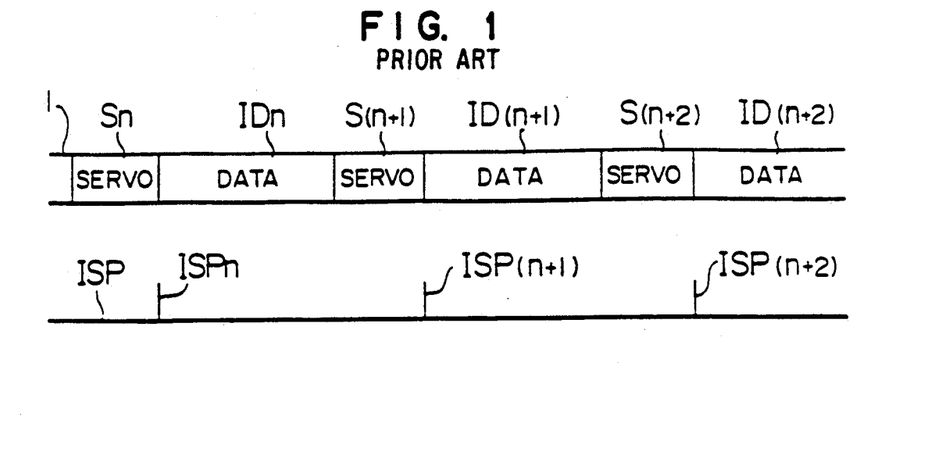
FIG. 1 a timing chart for representing both a data stream read out from the magnetic disk and an index sector signal formed by servo information contained within the data stream.

In FIG. 1, there are shown an arrangement of a signal for a track 1 in the conventional embedded servo type magnetic disk apparatus, and also a timing chart of generating the ISP signals corresponding thereto.

In the conventional magnetic disk apparatus employing the embedded servo, only one index sector pulse signal functioning as the base point for the read/write control is outputted in response to the servo information which has been read out from the servo (control signal) region of the recorded disk plane. That is to say, in response to signal edges of the servo information $S_n$, $S_{(n+1)}$ and $S_{(n+2)}$ read out from the track 1, the index sector pulse signals $ISP_n$, $ISP_{(n+1)}$, and $ISP_{(n+2)}$ are formed. In response to these ISP signals, the read/write controls for the corresponding data $ID_n$, $ID_{(n+1)}$ and $ID_{(n+2)}$ are performed. In other words, a single read/write operation is carried out with respect to a single servo region. The above-described prior art is opened described in, for example, Japanese patent application laid-open No. JP-A-1-194170 filed on Jan. 29, 1988 by Toshiba Corporation.

In data plane servo type magnetic disk apparatuses, a data region on which read data is recorded is referred to as a physical data length. The data length capable of being recorded on a single data region sandwiched by control signal regions for control signals, on which servo information to designate heads of data has been recorded, is predetermined by the types of magnetic disk apparatuse. This data length is fixed and thus cannot be arbitrarily varied by users.

In case that a data transfer demand is made from an external apparatus, e.g., a host apparatus to the magnetic disk apparatus, the data length accessed by the host apparatus within one access operation, namely the logic data length is not always coincident with the physical data length. Since the physical data length is fixed, this physical data length cannot be coincident with the logic data length.

When the logic data length is shorter than the physical data length, a data region corresponding to a difference between these two data lengths is not effectively utilized. This implies that a practical storage capacity of a disk is lowered and high recording density is deteriorated.

Furthermore, in the conventional embedded servo type magnetic disk apparatus, if the servo information cannot be read due to damages or the like of the disk, the ISP signal cannot be produced, so that the data stored in the data region positioned just after this damaged servo information cannot be read out from the disk.

SUMMARY OF THE INVENTION

An object of the present invention is to provide a magnetic disk controlling apparatus capable of transferring data having a logic data length shorter than a physical data length to an external apparatus without varying the physical data length, and capable of effectively utilizing a data region.

A further object of the present invention is to provide a magnetic disk controlling apparatus capable of reading data based upon previous servo information even when servo information cannot be read out.

A data read/write controlling apparatus of a magnetic disk, according to the present invention, comprises:

a unit for serially reading out a signal series of the servo signal and the data which have been recorded on the recording track;

a unit for generating a first read/write control signal in response to the servo signal of the read signal series;

v a unit for generating a second read/write control signal between the generation of the servo signal and a generation of a next servo signal;

a unit for writing given data into the data region of the recording track in response to the generation of the read/write control signal; and a unit for externally outputting data read out just after the read/write control signal is generated.

The data read/write controlling apparatus of a magnetic disk, according to the present invention, further comprises:

a unit for generating a third read/write control signal after a predetermined time period corresponding to an interval of the adjoining servo signals of the signal series, has passed from the generation of the first read/write control signal in case that there is no generation of a servo signal subsequent to the servo signal, wherein the unit for externally outputting the data, externally outputs data read out just after the third read/write control signal is produced.

In accordance with the present invention, since a plurality of read/write controlling signals are produced and outputted at different timings in response to servo information, the data region may be subdivided into plural regions in accordance with the plural read/write controlling signals. As a result, a logic data length shorter than the physical data length may be realized, and also all of the data regions may be utilized as the effective data region.

Also, according to the present invention, when servo information stored within an n-th sector ("n" being an integer) cannot be read, since the read/write controlling signals for the data part stored within the n-th sector are formed based on servo information stored within an (n−1)-th sector, the data stored in the n-th sector may be read therefrom.

DESCRIPTION OF THE PREFERRED EMBODIMENTS

The present invention will now be described more in detail with reference to preferred embodiments shown in the accompanying drawings.

Figure 2:
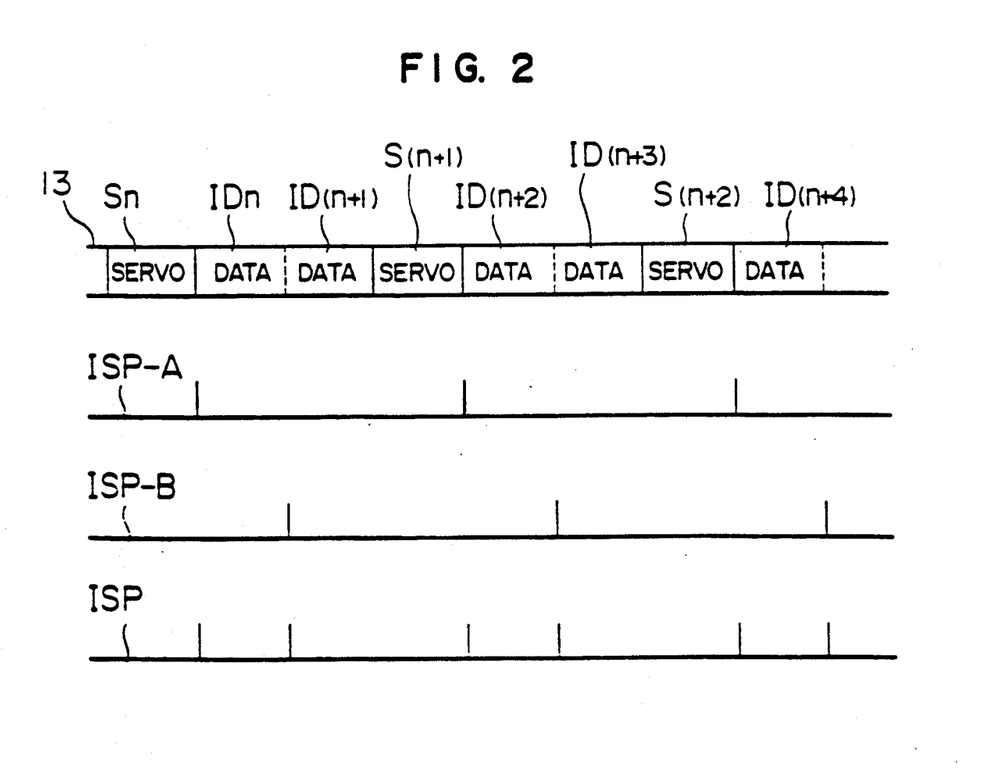
FIG. 2 is another timing chart for showing both a data stream read out from the magnetic disk and an index sector signal produced by servo information contained within the data stream.

FIG. 2 is a timing chart for representing a data stream (series) 13 read out from a magnetic disk and also index sector pulse signals ISP-A, ISP-B and ISP formed from servo information $S_n$, $S_{(n+1)}$, $S_{(n+2)}$, ---, within the above-described data stream 13 in a magnetic disk apparatus according to a preferred embodiment of the present invention. Also, in FIG. 2, the index sector pulse signal ISP is so produced by OR-gating the index sector pulse signals ISP-A and ISP-B.

Figure 3:
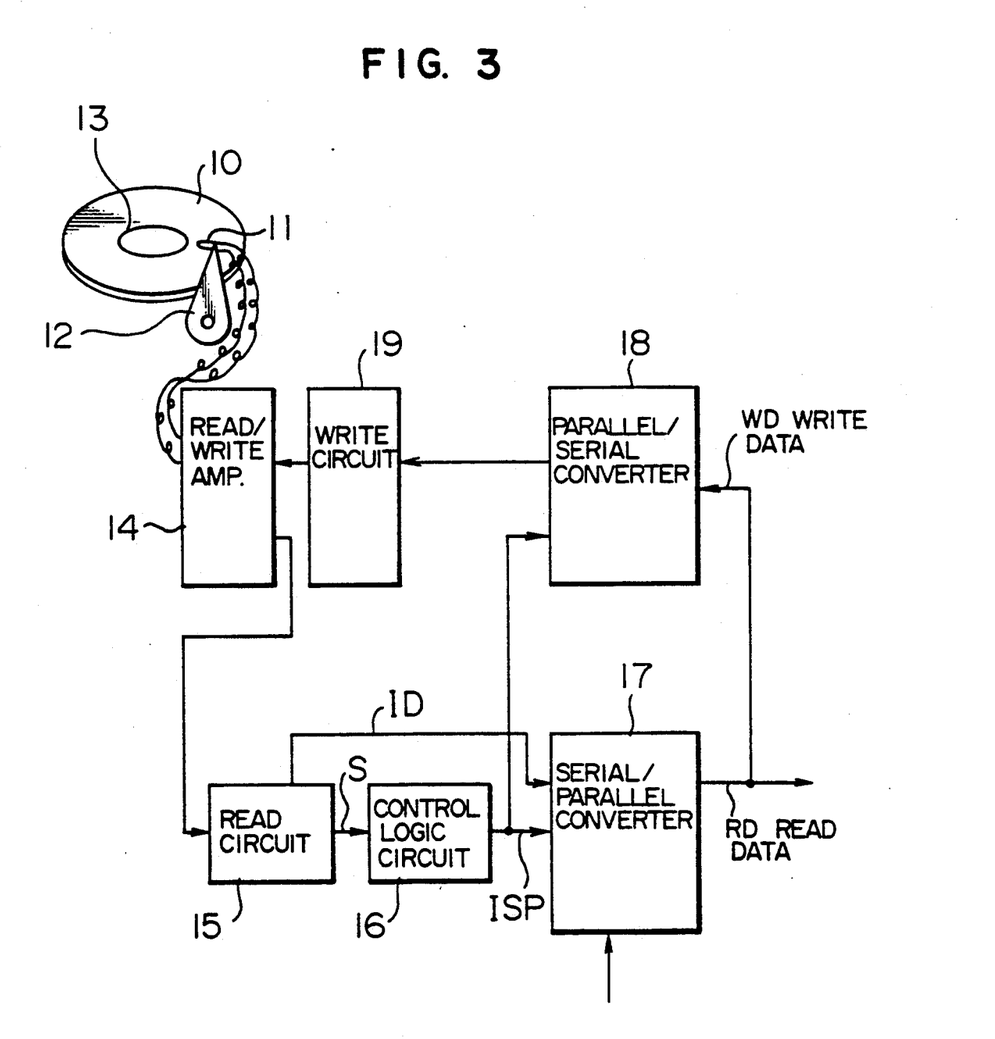
FIG. 3 is a schematic block diagram for showing a preferred embodiment of a magnetic disk apparatus according to the present invention.

FIG. 3 is a schematic block diagram for showing one preferred embodiment of a magnetic disk apparatus according to the present invention. First, a data reading operation will now be described. In FIG. 3, data 13 has been stored in a magnetic disk 10. Then, this data 13 is read via a head 11 mounted on an arm 12, and is inputted via a read/write amplifier 14 into a read circuit 15. The data is inputted into the read circuit 15 is classified, or separated into servo information "S" and real data "ID". The separation between the servo information "S" and the data "ID" may be realized by employing the known separating circuit. The servo information "S" is inputted into a control logic circuit 16, and further the data series ID is directly inputted into a serial-to-parallel converter 17. The logic control circuit 16 produces the index sector pulse signal ISP functioning as a base point for decoding the data series ID in accordance with the inputted servo information S, and then outputs this index sector pulse signal ISP to the serial/parallel converter 17. The serial/parallel converter 17 decodes the data series ID based on the inputted index sector pulse signal ISP. In an internal circuit of the control logic circuit 16, an index sector pulse signal ISP-A is generated which can be readily produced from the servo information S. In the prior art, as shown in FIG. 1, since only this index sector pulse signal ISP-A is employed as the index sector pulse signal ISP in order to perform the data decoding process, one physical data cannot be subdivided into a plurality of logic data as represented as the data series $ID_n$, $ID_{(n+1)}$ and $ID_{(n+2)}$. However, in accordance with this preferred embodiment, after the index sector pulse signal ISP-A has been transmitted, another index sector pulse ISP-B is newly generated within the control logic circuit 16. An output obtained by OR-gating the index sector pulse signal ISP-A and the index sector pulse signal ISP-B is used as an index sector pulse signal ISP which will then be outputted into the serial/parallel converter 17. As a consequence, a single data region of the data series 13 may be subdivided into two logic data regions. The serial/parallel converter 17 converts the inputted data into parallel data and outputs it as read data RD. As a consequence, it is possible to obtain a logic data length shorter than a physical data length.

Next, a writing operation of the data series will now be explained. Write data "WD" which has been externally inputted, is converted into a serial data series (stream) by way of a parallel-to-serial converter 18, and then the converted write data is inputted into a write circuit 19. It should be noted that the above-described converting operation is carried out in such a manner that the index sector pulse signal ISP (ISP-A, ISP-B) outputted from the control logic circuit 16 are used as a starting point. Since the servo information "S" has been already written into the track of the disk 10 (note that the data ID has not yet been written), the index sector pulse signal ISP is produced based on the readout servo information "S" similar to the read operation. Then, the write data "WD" which has been converted into serial data, is recorded on the magnetic disk 10 via the write circuit 19, a read/write amplifier 14, and the head 11. Accordingly, the data series 13 recorded on the magnetic disk 10 is recorded in synchronism with the index sector pulse signal ISP (ISP-A, ISP-B).

Figure 4:
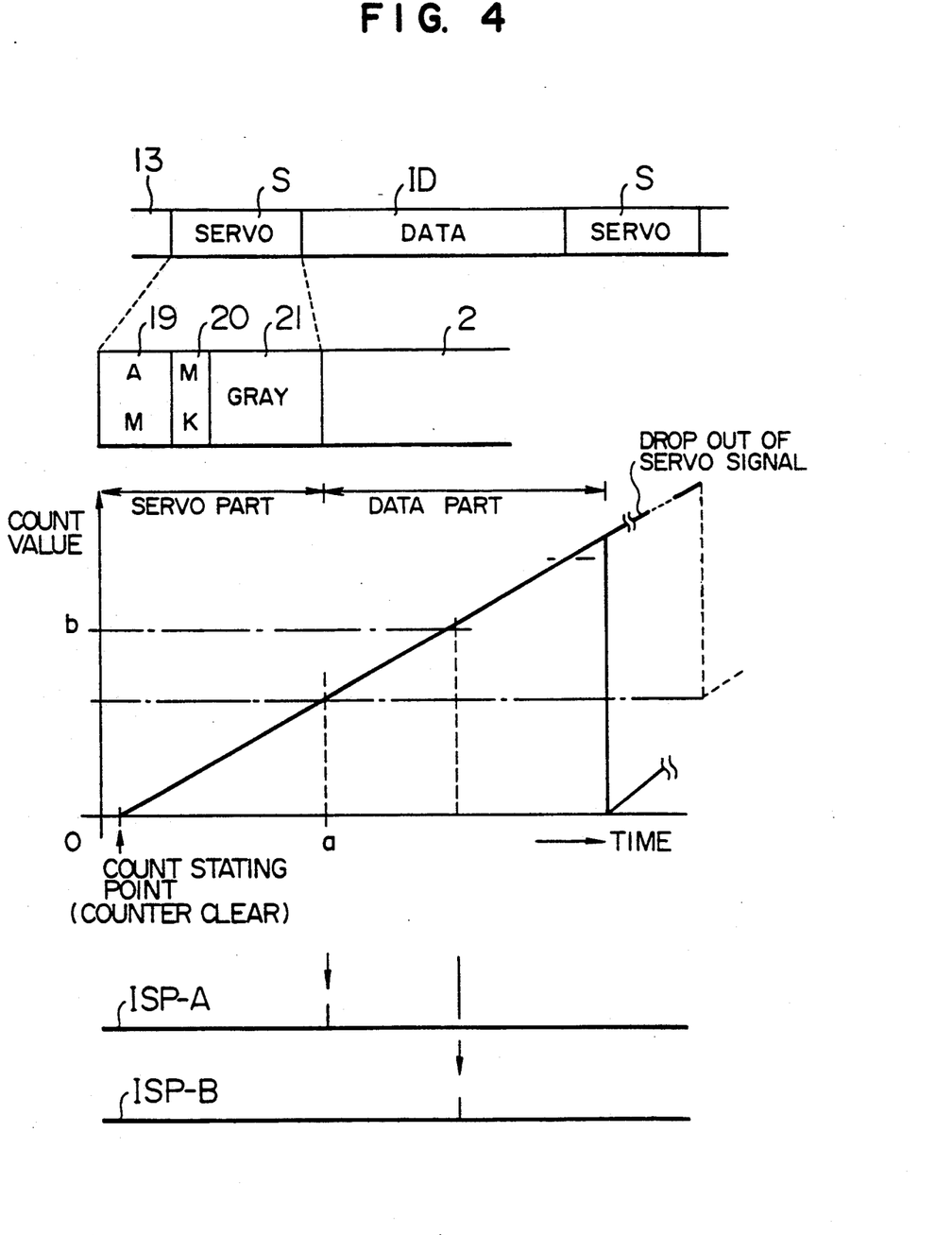
FIG. 4 is a timing chart for indicating an operation to generate two index sector signals based upon servo information of a readout data stream.

FIG. 4 is a timing chart for representing the index sector signals ISP-A and ISP-B based on the servo information "S" of the readout data series 13. As shown in this drawing, the servo information "S" is arranged by an AM 19 indicative of a head of a servo part, an MK part 20 representative of discrimination between the index signal and the sector signal; and a GRAY part 21 for indicating positional information of the head 11. First, an internal counter of the control logic circuit 16 is cleared by detecting the AM signal 19 from the data series 13, and this counter is continuously counted up in accordance with an elapse of time. The index sector pulse signal ISPA is produced at a timing "a" at which the counting value coincides with a predetermined value. This timing "a" corresponds to a point where the head 11 is positioned at a beginning of the data ID. Even after the index sector pulse signal ISP-A has been produced, the counting up operation of the counter is continued. Then, when the continued counting coincides with a timing "b", shifted from the timing "a", the index sector pulse signal ISP-B is produced. The counting to the index sector pulse signals ISP-A and ISP-B are made with a common clock signal. The ISP-B signal is time shifted from the ISP-A signal.

Figure 5:
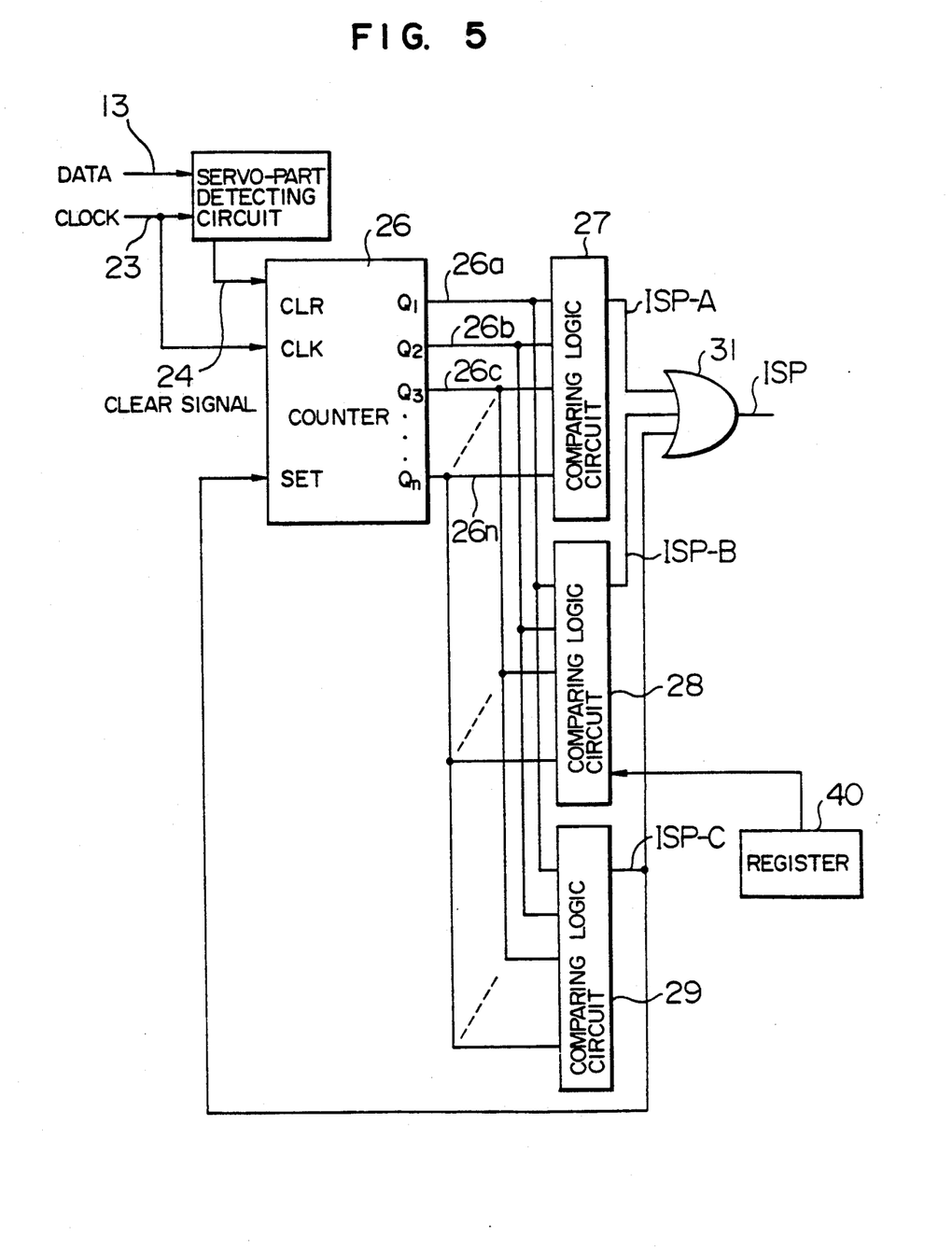
FIG. 5 is a schematic block diagram for representing one example of the reading circuit and control logic circuit shown in FIG. 1.
Figure 6:
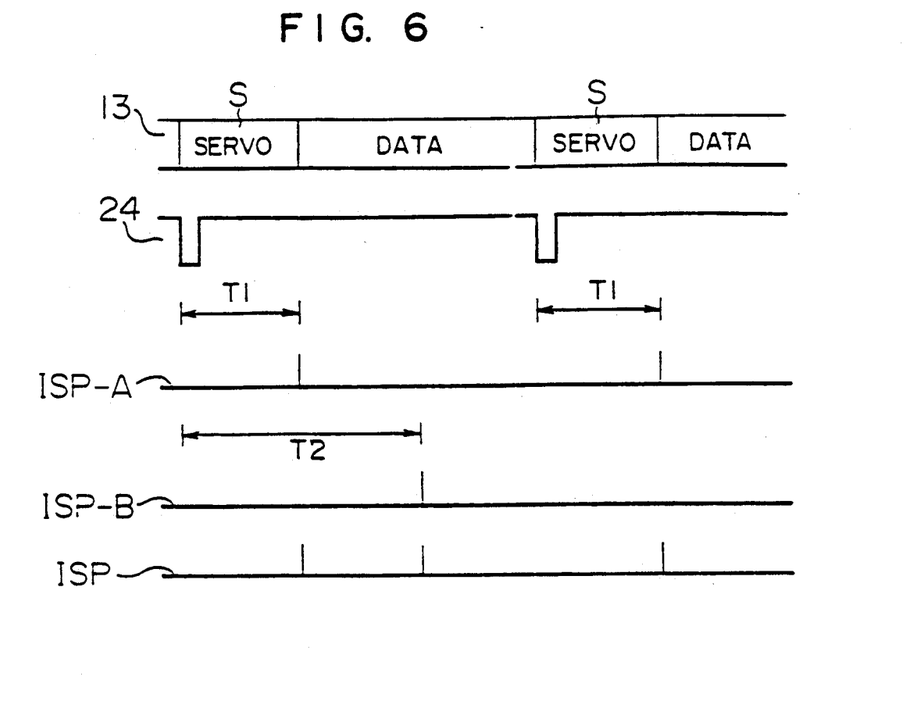
FIG. 6 is a timing chart for showing one example of an operation of the circuit shown in FIG. 5.

FIG. 5 is a schematic block diagram for showing an internal circuit of the control logic circuit 16 shown in FIG. 3. FIG. 6 is a timing chart for representing one example of an operation of the control logic circuit shown in FIG. 5. As shown in this drawing, the data series 13 is inputted into a servo-part detecting circuit 25 to perform a detection of a head of the servo information "S". Subsequently, the servo-part detecting circuit 25 issues an initializing signal 24 to a counter 26 for counting a clock pulse 23 which is outputted from a high precision crystal oscillator (not shown). The counter 26 for counting the clock pulse 23 outputted from the crystal oscillator, is reset by a clear signal, thereby starting its counting operation. Count values 26a, 26b, 26c to 26n outputted from the counter 26 are inputted into comparing logic circuits 27, 28 and 29. The comparing logic circuits 27, 28 and 29 judge whether or not preset values are coincident with the inputted count values 26a, 26b, 26c to 26n, and then outputs a pulse signal only when a coincidence is established. In other words, the comparing logic circuit 27 judges whether or not the count value from the counter 26 is equal to an output time "T₁" of the first index sector pulse signal ISP-A, and outputs the first index sector pulse ISP-A when these values are equal to each other. Also, after time has passed, when the comparing logic circuit 28 detects that the count value of the counter 26 is equal to an output time "T₂" of the second ISP-B, this comparing logic circuit 28 outputs the second index sector pulse signal ISP-B. Then, the index sector pulse signal ISP can be produced by OR-gating these two index sector pulse signals ISP-A and ISP-B.

Figure 7:
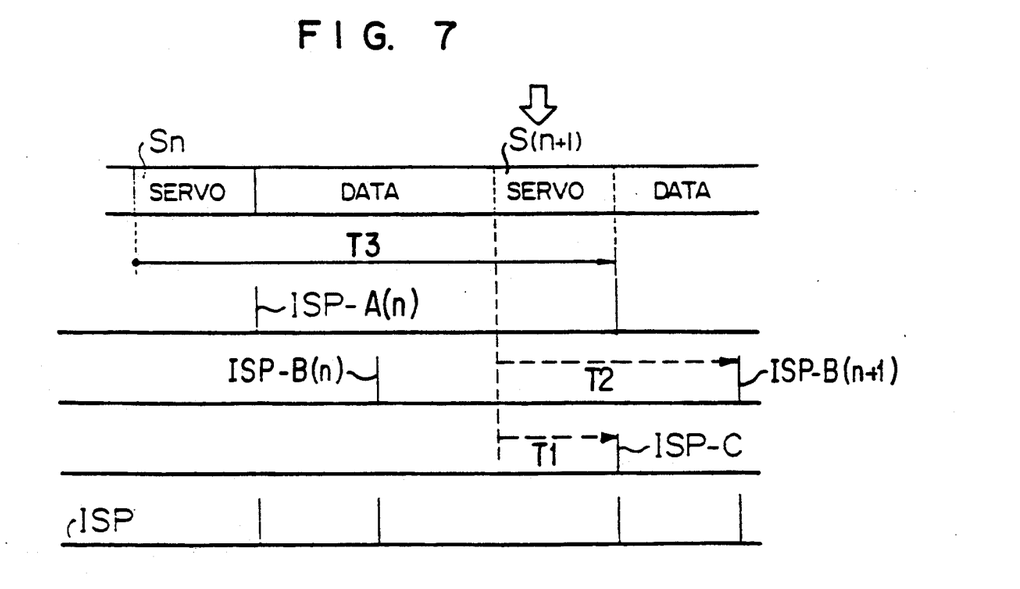
FIG. 7 is a timing chart for representing one example of an operation of the circuit shown in FIG. 5.

Next, referring to FIGS. 4, 5 and 7, a description will now be made of such a data reading operation that servo information cannot be read due to scratches formed on a magnetic disk. In FIG. 7, it is assumed that the servo information S$_{(n+1)}$ cannot be read out from the magnetic disk. In accordance with the servo information S$_n$ before the servo information S$_{(n+1)}$, the first index sector pulse signal ISP-An and the second index sector pulse signal ISP-B$_n$ are outputted. Even thereafter, the counting operation is continued without interrupting the operation of the 1 counter 26. In case that the servo information S$_{(n+1)}$ subsequent to the servo information S$_n$ which has been correctly read, cannot be read out, the servo-part detecting circuit 25 shown in FIG. 5 executes an operation thereof. If the reset signal 24 is not outputted from the servo-part detecting circuit 25 to the counter 6, the counter 26 continues its counting operation (refer to a dot line of FIG. 4). As a result, after the time "T3" has passed as shown in FIG. 7, the third index sector pulse signal ISP-C is outputted from the comparing logic circuit 29. Similar to the index sector pulse signals ISP-A and ISP-B, the index sector pulse signal ISP-C is inputted into the logic circuit 31 and becomes the index sector pulse signal. Also, the logic for generating the index sector pulse ISP-B which is produced at the count value T₂, may be simplified by controlling such that the count value of the counter 26 is set to the index sector pulse signal ISP-C is outputted.

In the preferred embodiment as previously described, the count value "b" at which the ISP-B signal was generated, fixed and previously set in the comparing logic circuit 28 shown in FIG. 5. However, as shown in FIG. 5, the timing for producing the ISP-B signal may be arbitrarily variable by additionally employing a register 40, by externally setting an arbitrary count value into the register 40, and by supplying this set value to the comparing logic circuit 28.

Furthermore, the present invention is not limited to the above-described preferred embodiment in which the data region is subdivided into two regions. For instance, the data region is subdivided into three regions or more regions by employing a plurality of comparing logic circuits same as the comparing logic circuit 28, whereby a relatively short logic data length may be read. In accordance with the present invention, a data region may be theoretically subdivided into minimum data access units each formed up to 1 byte by increasing a total number of the comparing logic circuit 28.

In accordance with the present embodiments, there are the following advantages. That is, as the index sector pulse signal is produced in the internal portion of the data region, the data region of the logic data length which is shorter than the physical data length can be maintained.

In the conventional techniques, when such a demand is issued that the logic data length is shortened less than ½ of the physical data length, this demand cannot be realized unless the total storage capacity is selected to be smaller than ½. To the contrary, such a demand can be realized without reducing the storage capacity according to the present embodiment.

Furthermore, there is another merit that even when the servo information cannot be read, the counter for realizing the data read/write operation may be commonly used with the counter for producing the index sector pulse signal in a single counter form, and thus readout of the servo information may be realized by a simple circuit arrangement.

What is claimed is:

1. A data read/write controlling apparatus for adjusting a data length of a magnetic disk in which a recording track is defined, said track having alternating control and data regions, a control region indicating a beginning of a data region and having a servo signal recorded therein, the a data region having a predetermined physical data length for recording data, the apparatus comprising:

(a) a reader serially reading out a signal series of said servo signal and said data which have been recorded on said recording track;

(b) a first controller being coupled to the reader, and generating a first read/write control signal in response to said servo signal of said signal series;

(c) a second controller being coupled to the reader, and generating a second read/write control signal after said servo signal is read out by the reader but before a next servo signal is read out by the reader, whereby the second read/write control signal provides a timing signal for separating said data region into at least two parts;

(d) a writer being coupled to the first and second controllers writing given data into said data region in response to the generation of said first or second read/write control signals, whereby given data can be written into either of said at least two parts of the data region; and (e) a converter being coupled to said reader, and said first and second controllers, and outputting only that data read out from said reader after said first or second read/write control signals corresponding to said servo signal are generated.

2. The apparatus according to claim 1, wherein said second controller measures the time since the first read/write control signal was generated, and produces said second read/write control signal after a predetermined time period has passed since said first read/write control signal was generated.

3. The apparatus according to claim 2, wherein said second controller comprises a timer indicating that an elapse of a predetermined time from the generation of said first read/write control signal has occurred, whereby said means for generating the second read/write control signal produces said second read/write control signal when said timer indicates that the predetermined time period has passed from the generation of said first read/write control signal.

4. The apparatus according to claim 2, wherein said second controller includes a timer sequentially calculating a plurality of different predetermined times since said first read/write controlling signal was generated, whereby said second controller produces a plurality of second read/write control signals one after each of said plurality of different predetermined times has passed since said first read/write control signal was generated.

5. A data read/write controlling apparatus for adjusting a data length of a magnetic disk in which a recording track is defined, said track having alternating control and data regions, the control region indicating a beginning of the data region and having a servo signal recorded therein, the data region having a predetermined physical data length for recording data, comprising:

(a) a reader serially reading out a signal series of said servo signal and said data which have been recorded on said recording track;

(b) a first controller being coupled to the reader and generating a first read/write control signal in response to said servo signal of said read signal series;

(c) a second controller being coupled to the reader and generating a second read/write control signal after said servo signal is read by said reader but before a next servo signal is read by said reader, the second read/write control signal giving a timing for separating said data region into at least two parts;

(d) a writer being coupled to the first and second controllers and writing given data into either of said at least two parts of said data region in response to said first and second read/write control signals;

(e) a converter being coupled to said reader and said first and second controllers, and outputting only that data red out by said reader after receiving the first and second read/write control signals corresponding to said servo signal; and (f) a third controller being coupled to said first controller and said converter, and generating a third read/write control signal after a predetermined time period has passed since the first read/write control signal was generated, wherein said predetermined time period corresponds to an expected time interval between two successive servo signals, whereby said third controller generates the third read/write control signal if said expected predetermined time interval elapses after a first servo signal is read out by said reader and before a next servo signal is read out by said reader and then said converter outputs only that data read out by said reader after generation of said third read/write control signal.

6. The apparatus according to claim 3, wherein said timer further comprises:

(a) a counter counting a clock signal in response to the generation of said first read/write control signal and outputting a count value; and (b) a comparator receiving the count value from the counter, comparing a set count value corresponding to the generation of said second read/write control signal with the count value received from the counter and producing said second read/write control signal when the count value of said counter is coincident with said set count value.

7. The apparatus according to claim 4, wherein said counter means further comprises:

(a) a counter counting a clock signal in response to the generation of said first read/write control signal, and outputting a count value; and (b) a comparator receiving the count value from the counter, and comparing it to a plurality of set count values corresponding to the generation of said plurality of second read/write control signals, and sequentially generating one of said plurality of second read/write control signals when the count value from said counter is coincident with each of said plurality of set count values.

8. A data read/write controlling apparatus for adjusting a data length of a magnetic disk in which a recording track is defined, said track being formed by alternating control region and data regions, the control region indicating a beginning of the data region and having a servo signal recorded therein, the data region having a predetermined physical data length for recording the data, comprising:

(a) a reader serially reading out a signal series of said servo signal and said data which have been recorded on said recording track;

(b) a first controller being coupled to the reader and generating a first read/write control signal in response to said servo signal of said read signal series;

(c) a second controller being coupled to the reader and the first controller, and generating a second read/write control signal between the reading out of said servo signal and a reading out of a next servo signal, wherein the second controller generates the second read/write control signal after a predetermined time period has passed since the first read/write control signal was generated, the second controller including a timer indicating an elapse, the second controller including a timer indicating an elapse of said predetermined time has occurred since the generation of said first read/write control signal, and said timer further comprises:

(i) a counter counting a clock signal in response to the generation of said first read/write control signal, and outputting a count value;

(ii) a comparator receiving the count value from the counter and comparing it to a set count value corresponding to the generation of said second read/write control signal and generating said second read/write control signal when the count value from said counter is coincident with said set count value; and (iii) a register being coupled to the comparator and capable of arbitrarily and externally varying said set count value;

(d) a writer being coupled to the first and second controllers and writing given data into said data region of said recording track in response to the generation of any one of said read/write control signal; and (e) a converter outputting only that data read out from said reader after said first or second read/- write control signals corresponding to said servo signal are generated.

9. A data read/write controlling apparatus for adjusting a data length of a magnetic disk in which a recording track is defined, said track being formed of alternating control and data regions, the control region indicating a beginning of the data region and having a servo signal recorder therein, the data region having a predetermined physical data length for recording data, comprising:

(a) a reader serially reading out a signal of said servo signal and said data which have been recorded on said recording track;

(b) a first controller being coupled to the reader and generating a first read/write control signal in response to said servo signal of said read signal series;

(c) a second controller being coupled to the reader and the first controller, and generating a plurality of second read/write control signals between the reading out of said servo signal and a reading out of a next servo signal, wherein the second controller generates one of the plurality of second read/write control signals after each of a plurality of predetermined time periods has passed since said first read/write control signal was generated, the second controller further comprises a timer sequentially measuring said plurality of different predetermined times, and the timer further comprises:

(i) a counter for counting a clock signal in response to the generation of said first read/write control signal, and outputting a count value;

(ii) a comparator receiving the count value from the counter and comparing it to a plurality of set count values corresponding to the generation of said plurality of second read/write control signals, whereby the second controller sequentially generates one of said plurality of second read/write control signals when the count value of said counter is coincident with each of said plurality of set count values; and (iii) a register being coupled to the comparator and being capable of arbitrarily and externally varying said plurality of set count values;

(d) a writer being coupled to the first and second controllers, and writing given data into said data region of said recording track in response to the generation of any of said read/write control signals; and (e) a converter being coupled to the reader and externally outputting only that data read out from said reader after any of the read/write control signals corresponding to said servo signal are generated.

10. A data read/write controlling apparatus for reading data from a magnetic disk in which a recording track is defined, said track being formed of alternating control and data regions, the control region indicating a beginning of the data region and having a servo signal recorder therein, said apparatus comprising:

(a) a reader serially reading out a signal series of said servo signal and said data which have been recorded on said recording track;

(b) a first controller being coupled to the reader, and generating a first read/write control signal in response to said servo signal of said signal series, and generating a second red/write control signal between the generation of said servo signal and a generation of a next servo signal;

(c) a writer being coupled to the first controller, and writing given data into said data region in response to the generation of the first and second control read/write control signals;

(d) a converter being coupled to the reader and the first controller, and externally outputting only that data read out by said reader after the first read/write control signal corresponding to said servo signal is generated; and (e) a second controller being coupled to the reader, the converter and the first controller, and generating a third read/write control signal only after a predetermined time interval, corresponding to a timer period between two successive servo signals, has elapsed since said first read/write control signal was generated and before a next servo signal was read out by said reader, wherein said converter externally only outputs that data red out from said reader after said third read/write control signal is generated, whereby said apparatus can read a particular data even if a particular servo signal associated with the particular data is not output by said reader.

11. An apparatus for outputting data stored on tracks of a magnetic medium, which tracks include alternating control and data regions, and which data is stored as first and second data each having a logic length that is smaller than a physical data length of the data region, said apparatus comprising:

(a) a magnetic interface device reading control information and data from the magnetic medium, and separating the control information from the data;

(b) a controller being coupled to the magnetic interface device and outputting a first pulse signal upon receipt of a control signal from the magnetic interface device, and outputting a second pulse signal after a predetermined time since outputting the first pulse signal; and (c) a converter receiving the data from the magnetic interface device, being coupled to the controller and outputting a first data upon receipt of the first pulse signal and outputting a second data upon receipt of the second pulse signal, whereby the apparatus outputs the first and second data, each of which have logic lengths that are shorter than the physical data length of the data region.

12. An apparatus for recording data on tracks of a magnetic medium, which tracks include alternating control and data regions, which control regions have control information previously stored therein, and which data is to be recorded as first and second data each having a logic length that is smaller than a physical data length of the data region, said apparatus comprising:

(a) a magnetic interface device reading control information from the magnetic medium, and writing the data on the data regions;

(b) a controller being coupled to the magnetic interface device and outputting a first pulse signal upon receipt of a control signal from the magnetic interface device, and outputting a second pulse signal after a predetermined time since outputting the first pulse signal; and (c) a converter being coupled to the controller and the magnetic interface device, receiving given data to be recorded on the magnetic interface device, outputting a first subset of the given data to the magnetic interface device upon receipt of the first pulse signal and outputting a second subset of the given data upon receipt of the second pulse signal, whereby the apparatus records the subsets of data in logic lengths that are shorter than the physical data length of the data region.

13. The apparatus according to claim 12, wherein said apparatus also outputs data stored on the tracks of the magnetic medium in logic lengths that are shorter than the physical data length of the data region, wherein said magnetic interface device reads control information and data from the magnetic medium, and separates the control information from the data, said device further comprising a second converter being coupled to the controller, receiving the data from the magnetic interface device, and outputting first data upon receipt of the first pulse signal and outputting second data upon receipt of the second pulse signal, whereby the apparatus outputs the data in logic lengths that are shorter than the physical data length of the data region.

14. The apparatus according to claim 11, wherein the controller further comprises:
(a) a clock outputting a cyclic clock signal;
(b) a detector being coupled to the magnetic interface device and outputting an initialization signal upon detecting the control signal;
(c) a counter being coupled to the clock and the detector, counting the cycles of the clock signal, and outputting a first signal indicative of the number of clock cycles, wherein the counter initialized by the initialization signal output from the detector;
(d) a first comparator receiving the first signal, having a first set count value, comparing the first signal to the first set count value, and outputting a first pulse signal when the first signal equals the first set count value; and
(e) a second comparator receiving the first signal, having a second set count value and outputting a second pulse signal when the first signal equals the second set value.

15. The apparatus according to claim 12, wherein the controller further comprises:
(a) a clock outputting a cyclic clock signal;
(b) a detector being coupled to the magnetic interface device and outputting an initialization signal upon detecting the control signal;
(c) a counter being coupled to the clock and the detector, counting the cycles of the clock signal, and outputting a first signal indicative of the number of clock cycles, wherein the counter is initialized by the initialization signal output from the detector;
(d) a first comparator receiving the first signal, having a first set count value, comparing the first signal to the first set count value, and outputting a first pulse signal when the first signal equals the first set count value; and
(e) a second comparator receiving the first signal, having a second set count value and outputting a second pulse signal when the first signal equals the second set value.

16. The apparatus according to claim 14, further comprising a register controlling the set count value of the second comparator, whereby said register can vary the predetermined time between the first and second pulse signals.

17. The apparatus according to claim 14, further comprising an OR gate receiving the first and second set pulse signals and outputting a single pulse signal having two pulses displaced in time by the predetermined time.

18. A method for outputting data stored on tracks of a magnetic medium, which tacks include alternating control and data regions, and which data is stored as first and second data each having a logic length that is smaller than a physical data length of the data region, said method comprising the steps of:
(a) reading control information and data from the magnetic medium;
(b) separating the control information from the data;
(c) generating a first pulse signal upon reading out a control signal from the magnetic interface device;
(d) generating a second pulse signal a predetermined time period after generating the first pulse signal;
(e) outputting a first data from a converter after the converter receives the first pulse signal;
(f) outputting a second data from the converter after the converter receives the second pulse signal, whereby the apparatus outputs the data in logic lengths that are shorter than the physical data length of the data region.

19. A method for recording data on tracks of a magnetic medium, which tracks include alternating control and data regions, which control regions have control information previously stored therein, and which data is to be recorded as first and second data each hiving a logic length that is smaller than a physical data length of the data region, said method comprising the steps of:
(a) reading control information from the magnetic medium;
(b) writing the data on the data regions;
(c) generating a first pulse signal upon reading out a control signal from the magnetic interface device;
(d) generating a seconded pulse signal a predetermined time period after generating the first pulse signal;
(e) outputting a second pulse signal a predetermined time period after generating the first pulse signal;
(e) outputting a first data of the given data to a magnetic interface device from a converter after receipt of the first pulse signal; and
(f) outputting a second data of the given data to the magnetic interface device from a converter upon receipt of the second pulse signal, whereby the apparatus records the data in logic lengths that are shorter than the physical data length of the data region.

20. The method according to claim 19, wherein the method outputs the data stored on the tracks, said method further comprising the steps of:
(g) reading the control information and the data from the magnetic medium;
(h) separating the control information from the data;
(i) outputting the first data from a second converter after the second converter receives the first pulse signal; and
(j) outputting the second data from the second converter after the second converter receives the second pulse signal, whereby the apparatus outputs the data in logic lengths that are shorter than the physical data length of the data region.

* * * * *

UNITED STATES PATENT AND TRADEMARK OFFICE
CERTIFICATE OF CORRECTION

PATENT NO. : 5,313,340
DATED : May 17, 1994
INVENTOR(S) : Norikazu Takayama, et al It is certified that error appears in the above-indentified patent and that said Letters Patent is hereby corrected as shown below:

| Column | Line | |
|---|---|---|
| 1 | 52 | Delete "opened". |
| 1 | 63 | Change "apparatuse." to --apparatus.--. |
| 2 | 39 | Delete "v". |
| 5 | 37 | Change "An" to --$A_n$--. |
| 5 | 46 | Change "counter 6" to --counter 26--. |
| 7 | 46 | Change "red" to --read--. |
| 8 | 44 | After "elapse" delete ", the second controller including a timer". |
| 8 | 45 | Delete "indicating an elapse". |
| 10 | 14 | Change "timer" to --time--. |

UNITED STATES PATENT AND TRADEMARK OFFICE
CERTIFICATE OF CORRECTION

PATENT NO. : 5,313,340
DATED : May 17, 1994
INVENTOR(S) : Norikazu Takayama, et al It is certified that error appears in the above-indentified patent and that said Letters Patent is hereby corrected as shown below:

| Column | Line  |                                     |
|--------|-------|-------------------------------------|
| 10     | 18    | Change "red" to --read--.           |
| 11     | 30    | After "counter" insert --is--.      |
| 12     | 30    | Change "hiving" to --having--.      |
| 12     | 38    | Change "seconded" to --second--.    |
| 12     | 41-42 | Delete both lines.                  |

Signed and Sealed this

Twenty-seventh Day of September, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

| | | |
|---|---|---|
| PATENT NO. | : 5,313,340 | Page 1 of 1 |
| APPLICATION NO. | : 07/823299 | |
| DATED | : May 17, 1994 | |
| INVENTOR(S) | : Norikazu Takayama et al. | |

It is certified that error appears in the above-identified patent and that said Letters Patent is hereby corrected as shown below:

<u>Column</u>       <u>Line</u>

6      36      Change "the a data region" to -- the data region --.

Signed and Sealed this

Nineteenth Day of February, 2008

JON W. DUDAS
*Director of the United States Patent and Trademark Office*